US012392173B2

(12) United States Patent
Naudet

(10) Patent No.: US 12,392,173 B2
(45) Date of Patent: Aug. 19, 2025

(54) LOCK COMPRISING A SLIDER FLUSH RELATIVE TO A SOLE PLATE PROVIDED WITH A RECESS FOR RECEIVING A TRANSLATION STOP PREVENTING THE SLIDER FROM TRANSLATING

(71) Applicant: IMC CREATIONS, Bouthéon (FR)

(72) Inventor: James Naudet, Saint-Rambert (FR)

(73) Assignee: IMC CREATIONS, Bouthéon (FR)

( * ) Notice: Subject to any disclaimer, the term of this patent is extended or adjusted under 35 U.S.C. 154(b) by 424 days.

(21) Appl. No.: 17/926,755

(22) PCT Filed: Jun. 21, 2021

(86) PCT No.: PCT/EP2021/066838
§ 371 (c)(1),
(2) Date: Nov. 21, 2022

(87) PCT Pub. No.: WO2021/259859
PCT Pub. Date: Dec. 30, 2021

(65) Prior Publication Data

US 2023/0235599 A1 Jul. 27, 2023

(30) Foreign Application Priority Data

Jun. 26, 2020 (FR) ........................................ 2006711

(51) Int. Cl.
*E05B 79/02* (2014.01)
*E05B 17/20* (2006.01)
*E05B 85/06* (2014.01)

(52) U.S. Cl.
CPC .......... *E05B 79/02* (2013.01); *E05B 17/2049* (2013.01); *E05B 85/06* (2013.01)

(58) Field of Classification Search
CPC .... E05B 17/20; E05B 17/049; E05B 17/2057; E05B 17/2007; E05B 17/203; E05B 17/2038; E05C 1/04; E05C 17/48
(Continued)

(56) References Cited

U.S. PATENT DOCUMENTS 1,490,988 A * 4/1924 Soref ........................ E05C 1/04
70/32
1,755,935 A * 4/1930 Roberts .................. B60N 2/005
70/261

(Continued)

FOREIGN PATENT DOCUMENTS

CA 2290456 A1 * 10/1999
EP 3561205 A1 10/2019

(Continued)

OTHER PUBLICATIONS

International Search Report and Written Opinion issued on Oct. 27, 2021, in corresponding International Application No. PCT/EP2021/066838, 17 pages.

*Primary Examiner* — Christine M Mills
*Assistant Examiner* — Faria F Ahmad
(74) *Attorney, Agent, or Firm* — Maier & Maier, PLLC

(57) ABSTRACT

A lock with a sole plate and a slider, guided in translation relative to one another by a guide between two positions, an extended position and a retracted position. The slider includes a bearing surface which extends in a sliding plane defined by the guide and an indentation relative to the bearing surface forming a translation stop in one of the two positions. The sole plate cooperates with a retractable pin of a lock carried by the slider, to lock it in the extended position and in the retracted position. The slider comprises, opposite the indentation relative to the retractable pin of the locking means, a translation stop in the extended position.

8 Claims, 6 Drawing Sheets

(58) Field of Classification Search
USPC ............................................................... 70/95
See application file for complete search history.

(56) References Cited

U.S. PATENT DOCUMENTS

| | | | | | |
|---|---|---|---|---|---|
| 2,974,987 | A * | 3/1961 | O'Brien | E05B 67/38 | 292/148 |
| 4,095,828 | A * | 6/1978 | East | E05B 67/383 | 292/148 |
| 4,121,863 | A * | 10/1978 | Lawrence | E05C 1/04 | 292/150 |
| 4,159,838 | A * | 7/1979 | Wilzig | E05B 17/2038 | 292/87 |
| 4,229,956 | A * | 10/1980 | Thorburn | E05B 35/08 | 292/148 |
| 4,234,220 | A * | 11/1980 | Finch | E05B 67/383 | 292/148 |
| 4,641,506 | A * | 2/1987 | Boucher | E05C 1/04 | 70/129 |
| 4,798,065 | A | 1/1989 | Deforrest, Sr. | | |
| 4,802,351 | A * | 2/1989 | Kojak | E05B 67/383 | 70/56 |
| 4,884,421 | A * | 12/1989 | Lindsay | E05B 67/383 | 70/432 |
| 5,284,371 | A * | 2/1994 | Richardson | E05B 65/0876 | 292/149 |
| 5,315,850 | A * | 5/1994 | Edeus | E05C 1/04 | 70/369 |
| 5,931,032 | A * | 8/1999 | Gregory | H01F 10/3268 | 70/56 |
| 6,477,872 | B1 * | 11/2002 | Denton, Jr. | E05B 67/36 | 70/80 |
| 10,267,059 | B1 * | 4/2019 | Schulz | E05B 15/0205 | |
| 2006/0162404 | A1 * | 7/2006 | Hsieh | E05B 41/00 | 70/432 |
| 2019/0106909 | A1 * | 4/2019 | Wright | E05B 15/0295 | |
| 2020/0208437 | A1 * | 7/2020 | Cheng | E05B 47/004 | |

FOREIGN PATENT DOCUMENTS

| | | | | | |
|---|---|---|---|---|---|
| FR | 2997986 | A1 | | 5/2014 | |
| GB | 1017570 | A | * | 1/1966 | |
| GB | 1172476 | A | * | 12/1969 | |
| GB | 2254365 | A | * | 10/1992 | E05C 1/04 |
| GB | 2275077 | A | * | 8/1994 | E05B 63/126 |
| GB | 2356017 | A | | 5/2001 | |
| WO | WO-2011143687 | A1 | * | 11/2011 | E05B 13/002 |

* cited by examiner

[Fig. 0001]
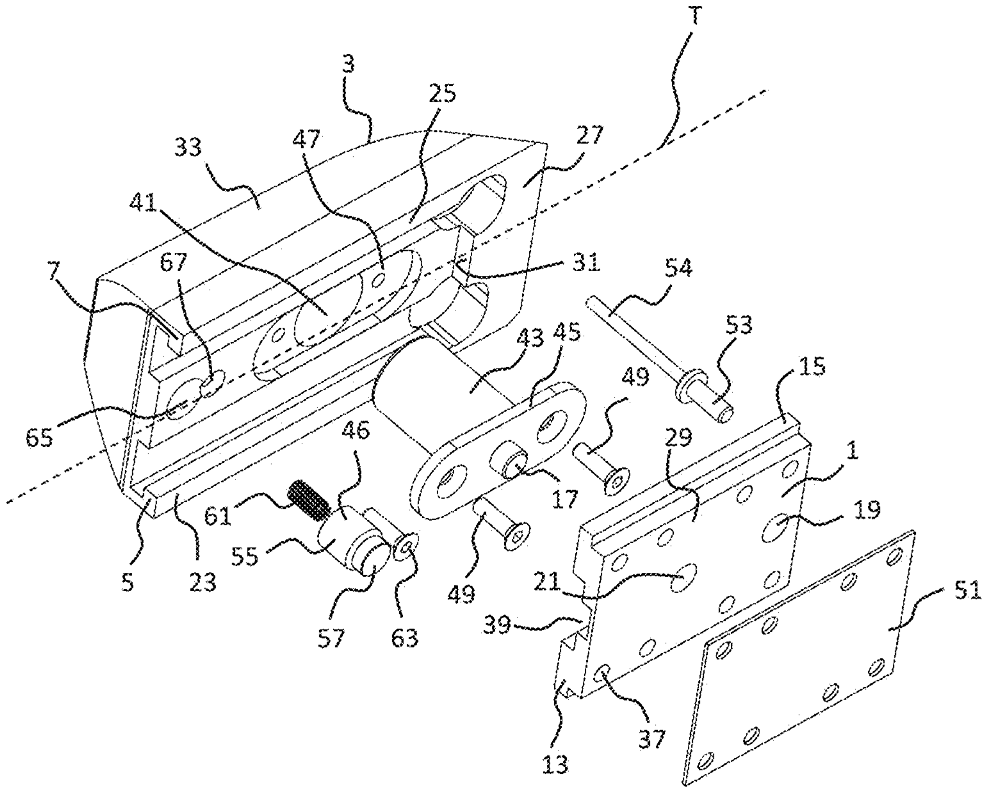
[Fig. 0002]
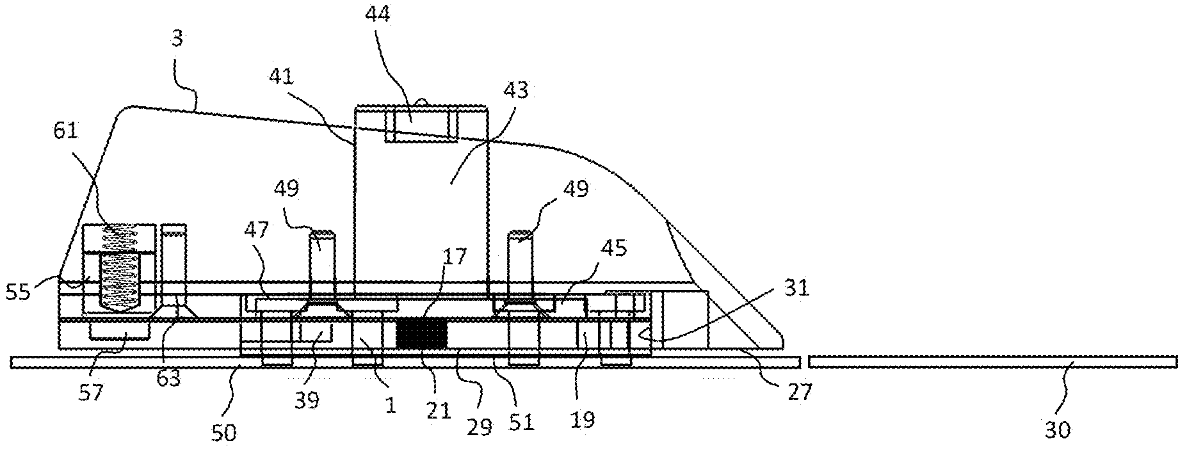

[Fig. 0003]
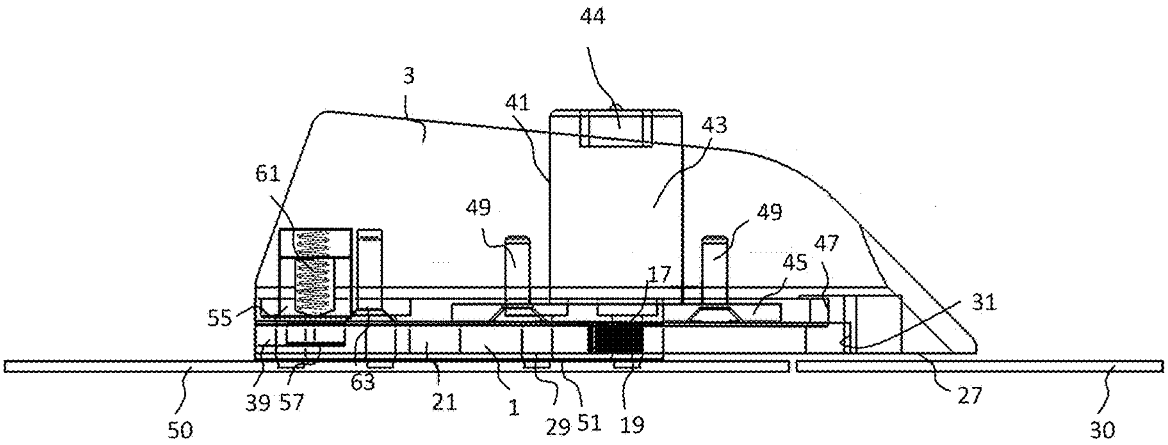
[Fig. 0004]
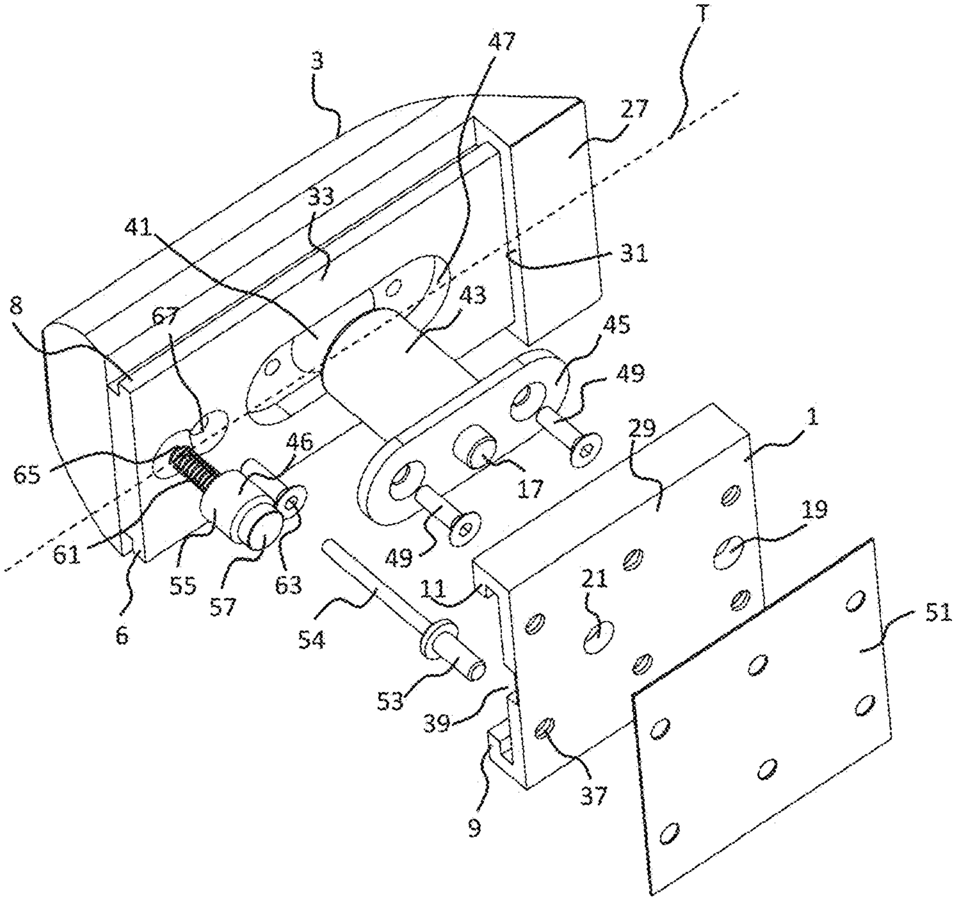

[Fig. 0005]
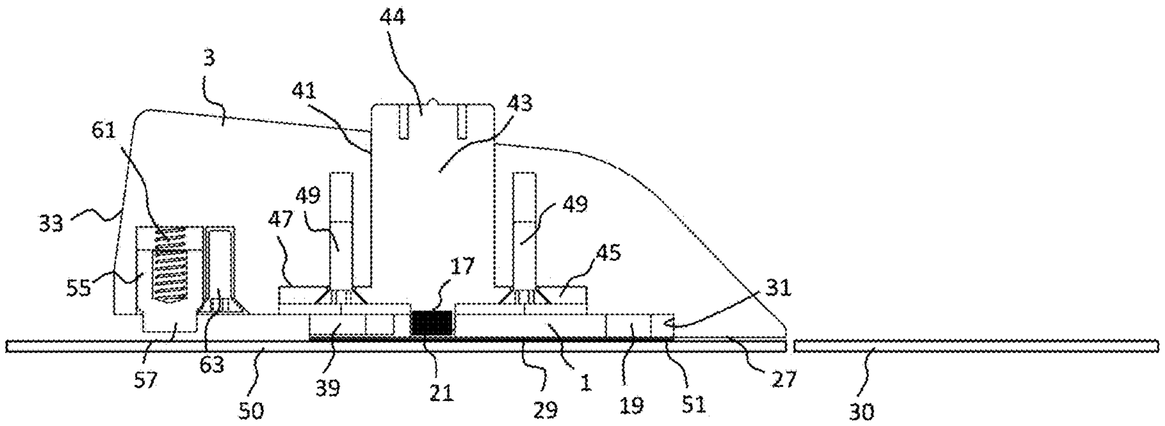
[Fig. 0006]
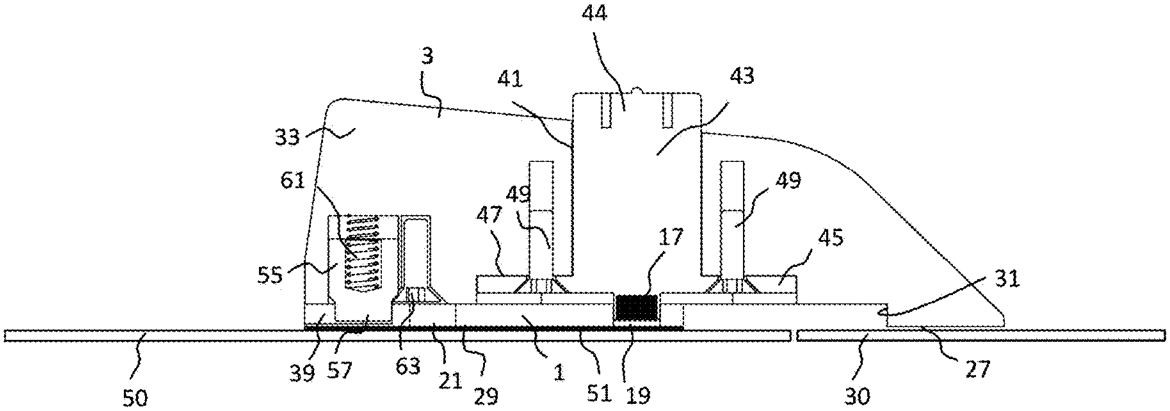
[Fig. 0007]
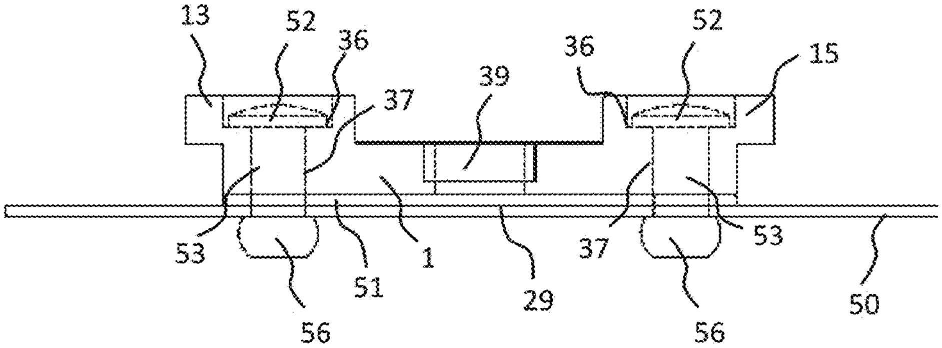

[Fig. 0008]
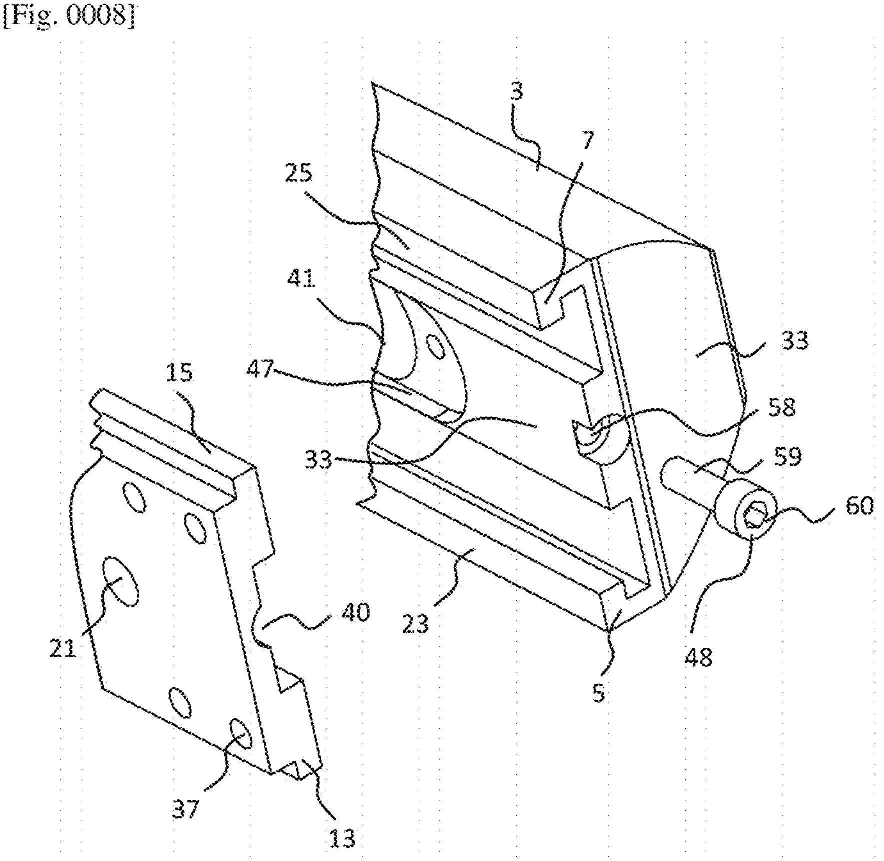

[Fig. 0009]
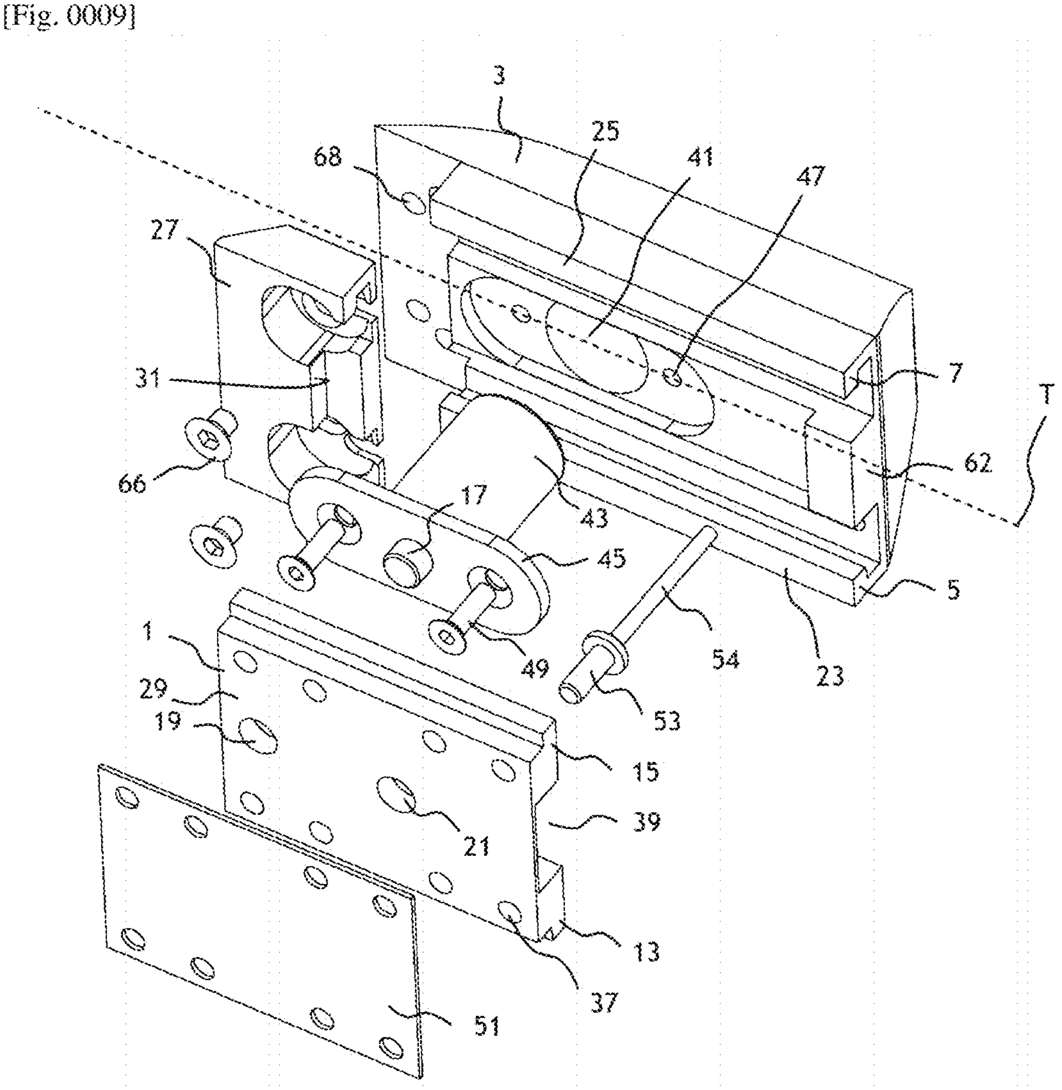

[Fig. 0010]
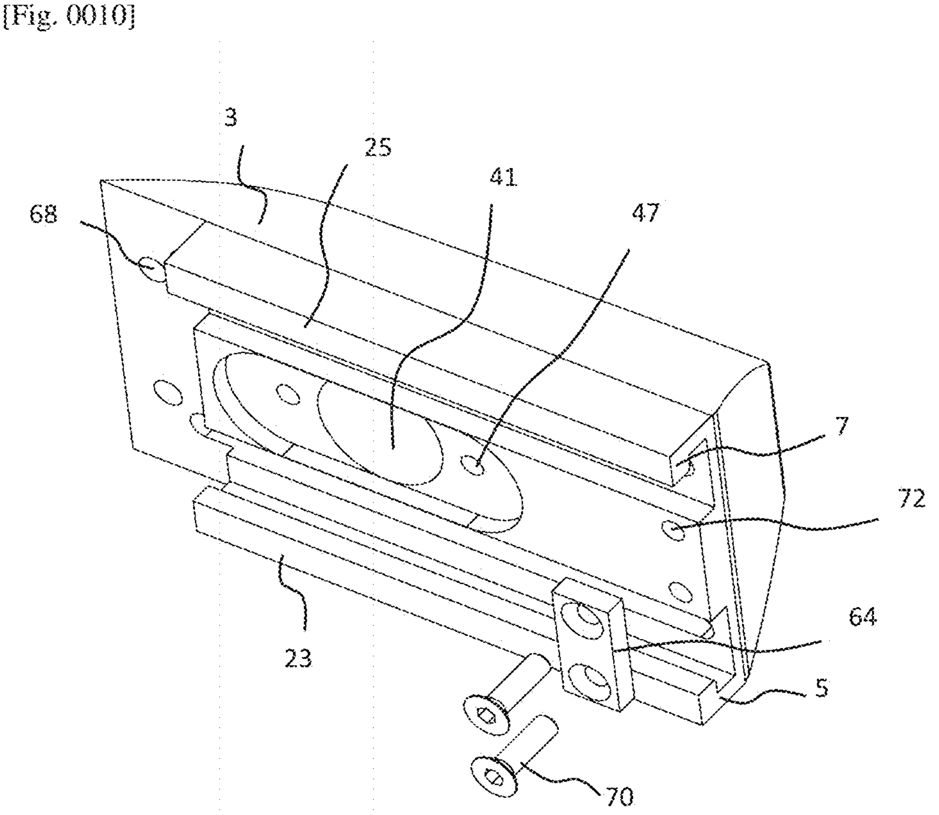

LOCK COMPRISING A SLIDER FLUSH RELATIVE TO A SOLE PLATE PROVIDED WITH A RECESS FOR RECEIVING A TRANSLATION STOP PREVENTING THE SLIDER FROM TRANSLATING

BACKGROUND

The invention relates to a lock comprising more particularly a sole plate and a slider, guided in translation relative to one another by guide means, between an extended position and a retracted position. The slider comprises a bearing surface which extends in a sliding plane defined by the guide means. It also comprises an indentation relative to the bearing surface to form a translation stop in one of the two positions. The sole plate cooperates with the retractable pin of a locking means carried by the slider, to lock it in the extended position and in the retracted position. The slider comprises, opposite the indentation relative to the retractable pin of the locking means, a translation stop in the other position.

SUMMARY

A lock of this type is known in particular from document FR 2997986. The stop opposite the indentation is a concealable screw attached perpendicularly to the sliding plane defined by the guide means. This arrangement is used to attach the sole plate on a support, before inserting the slider into the guide means. Attachment means, in particular rivets, are inserted from a side opposite an attachment base touching the support. We speak in this case of an assembly "from the outside", in other words an assembly for which the attachment means are inserted, for example, from the outside of a vehicle. However, the bearing surface of the slider which extends in the sliding plane defined by the guide means is raised relative to this attachment base. A strike is provided to receive this raised portion and allow locking as close as possible, for example between a vehicle sliding door to which the strike is attached and the frame to which the sole plate is attached. The respective guide means of the strike and of the sole plate must therefore be aligned very precisely, so that the slider slides smoothly between the retracted position, when the lock is opened, and the extended position, when the lock is closed.

Document U.S. Pat. No. 4,798,065 discloses another lock in which the bearing surface of the slider is raised relative to the base for attaching the sole plate. The retractable pin of the slider locking means as well as the translation stop in the extended position are carried by the sole plate. In addition, this stop, in this case a screw added to the sole plate, also acts as translation stop in the retracted position, by cooperating with a recess formed in the slider. Since this screw is added to the sole plate from the attachment base, the slider is inserted into the guide means, before attaching the sole plate of the lock on a support.

Document EP 3561205 A discloses a lock in which the slider bearing surface is flush with the base for attaching the sole plate. With this arrangement, the bearing surface is advantageously kept in the plane of the base for attaching the sole plate by guide means, between the retracted position and the extended position. Thus, precise locking is obtained in an application with a single sole plate. The slider comprises grooves closed at two opposite ends while attachment screws, added to the sole plate from the attachment base, form translation stops in the extended position by fitting into these grooves. In this construction, the slider is inserted into the guide means, before attaching the sole plate of the lock on a support.

One purpose of the invention is thus to modify a lock of the type which has just been described, to improve the ease of attachment of the sole plate and the slider locking precision.

Thus, the invention relates to a lock comprising a sole plate and a slider, guided in translation relative to one another by guide means between two positions, an "extended" position and a "retracted" position, the slider comprising a bearing surface which extends in a sliding plane defined by the guide means and an indentation relative to the bearing surface forming a translation stop in one of the two positions, the sole plate cooperating with a retractable pin of a means for locking the slider, to lock it in the extended position and in the retracted position, the slider comprising, opposite the indentation relative to the retractable pin of the locking means, a translation stop in the other position, characterized in that the bearing surface is flush with a base for attaching the sole plate while the translation stop is received in a recess of the sole plate.

The slider bearing surface flush with the base for attaching the sole plate allows precise locking in an application with a single sole plate, while the stop, received in a recess of the sole plate, allows the slider to be inserted into the guide means of the sole plate once the latter has been attached to a support to which the lock must be assembled.

In other words, the stop opposite the indentation relative to the flush bearing surface of the slider is received in a recess of the sole plate to block the translation of the slider relative to the sole plate in the extended position, the indentation forming a stop in the retracted position.

According to a first embodiment, the flush bearing surface is integrated in the slider and the stop is retractable perpendicularly to the sliding plane.

According to a second embodiment, the flush bearing surface is integrated in the slider and the stop is concealable in the sliding plane.

According to a third embodiment, the flush bearing surface is concealable relative to the slider and the stop is integrated in or added to the slider.

Due to its retractable or concealable nature, the stop opposite the indentation or the flush bearing surface allows the slider and the sole plate to be assembled together and disassembled, by simple sliding along the guide means, once the sole plate has been attached to a panel, for example a vehicle door. Advantageously, the lock is attached to the frame, outside the vehicle, to block the door.

BRIEF DESCRIPTION OF THE FIGURES

Other advantages of the invention will appear on reading the description of the embodiments illustrated by the drawings.

FIG. 1 is an exploded view illustrating a first embodiment of the invention.

FIG. 2 is a front view of the first embodiment of the invention, with the slider in a retracted position.

FIG. 3 is a front view of the first embodiment of the invention, with the slider in an extended position.

FIG. 4 is an exploded view illustrating a variant of the first embodiment of the invention.

FIG. 5 is a front view of the variant of the first embodiment of the invention, with the slider in a retracted position.

FIG. 6 is a front view of the variant of the first embodiment of the invention, with the slider in an extended position.

FIG. 7 is a cross-sectional view of the sole plate of a lock according to the first embodiment.

FIG. 8 is an exploded and truncated view of a second embodiment of the invention.

FIG. 9 is an exploded view illustrating a third embodiment of the invention.

FIG. 10 is an exploded and truncated view of a variant of the third embodiment of the invention.

DETAILED DESCRIPTION

The invention is described using the three embodiments mentioned above. Elements common to these embodiments are designated by the same reference.

A lock according to one of the embodiments comprises a sole plate 1 and a slider 3. These two elements are guided in translation relative to one another by guide means, some 5, 7, 6, 8 carried by the slider 3, others 9, 11, 13, 15 carried by the sole plate 1. These guide means extend in a direction T defining the direction of translation of the slider 3, between a retracted position and an extended position relative to the sole plate 1.

In the first embodiment, the guide means 5, 7 of the slider 3 consist of a slide and the guide means 13, 15 of the sole plate 1 consist of a rail of shape matching that of the slide. In the variant of this first embodiment, the guide means 6, 8 of the slider 3 consist of a rail and the guide means 9, 11 of the sole plate 1 consist of a slide of shape matching that of the rail.

The slider 3 comprises a bearing surface 27 extending flush with a base 29 for attaching the sole plate 1, in the retracted position and in the extended position. The bearing surface 27 of the slider 3 is kept in the plane of the base 29 for attaching the sole plate 1 by the guide means 5, 7, 6, 8, 9, 11, 13, 15 during its translation. The lock therefore ensures precise and reliable locking in an application with a single sole plate. The expression "flush" means that the bearing surface 27 of the slider and the base 29 for attaching the sole plate 1 extend in the same plane.

In the first and second embodiments, the bearing surface 27 is integrated in the slider 3 while in the third embodiment, it is concealable relative to the base 33 of the slider 3.

In the three embodiments, the flush bearing surface 27 is delimited by an indentation 31 relative to the guide means 5, 7 of the slider 3, FIG. 1 or FIG. 9, or to the guide means 6, 8 of the sole plate 1, FIG. 4. The bearing surface 27 therefore closes the guide means 5, 7; 6, 8 of the slider 3 on the sole plate 1 in the retracted position as well as in the extended position, thereby preventing the introduction of a foreign body, or even a vandalism tool, between the slider 3 and the sole plate 1.

The first embodiment, FIG. 1, is particular in that the slider 3 comprises an additional first bearing surface 23 and an additional second bearing surface 25, integrated in the slides 5, 7 of the slider 3.

The bearing surface 27 and the additional bearing surfaces 23, 25 define a "lower" side of the base 33 of the slider 3. The base 33 is provided with a bore 41 to receive a locking means 43, for example a barrel comprising a cylinder assembled on an attachment plate 45. The locking means 43 is provided with a lock 44 and a pin 17 retractable relative to the attachment plate 45 which is housed in a recess 47 formed in the base 33 of the slider where it is attached by attachment means 49.

The retractable pin 17 locks the slider 3 in the retracted position or in the extended position. Locking is carried out by the retractable pin 17 cooperating with perforations 19, 21 formed in the sole plate 1, one 19 defining the extended position and the other 21 defining the retracted position. The perforations 19, 21 are through or blind perforations.

The indentation 31 relative to the bearing surface 27 and to the guide means 5, 7; 6, 8 forms a translation stop. Preferably, this indentation 31 is arranged relative to the retractable pin 17 of the locking means 43 so as to form a translation stop in the retracted position of the slider 3, defined by the corresponding perforation 21 of the sole plate 1.

The lock may comprise a shim 51 to be inserted between the base 29 for attaching the sole plate 1 and the panel to which the lock will be installed, for example a swing or sliding door, or the frame. The shim 51 can be used to seal and if necessary shift the slider 3 relative to the upright, to prevent the bearing surface 27 and the additional bearing surfaces 23, 25 from rubbing during translation from the retracted position to the extended position.

The perforation 19 of the sole plate 1 defining the extended position of the slider 3 firstly and the retractable pin 17 of the locking means 43 of the slider 3 secondly, are arranged, relative to one end respectively of the sole plate 1 and of the slider 3, such that these two "rear" ends are aligned when the slider 3 is in the extended position. Said rear end of the slider 3 is defined by opposition to the indentation 31 while said rear end of the sole plate 1 is defined by opposition to the perforation 19 which defines the extended position of the slider 3. With this arrangement, the slider 3 covers the sole plate 1 throughout its translation. The two elements thus form an enclosed assembly in all translation positions of the slider relative to the sole plate.

The slider 3 comprises, opposite the indentation 31 relative to the retractable pin 17 of the locking means 43, a blocking means to form a translation stop in the extended position. According to the invention, this blocking means or translation stop is received in a recess of the sole plate.

According to the first embodiment, FIGS. 1 to 6, the stop 46 is retractable perpendicularly to the sliding plane. According to the second embodiment, FIG. 8, the stop 48 is concealable in the sliding plane. According to the third embodiment, FIGS. 9 and 10, the stop is integrated in, reference 62, or added to, reference 64, the slider 3 by assembly means, for example screws 70 screwed into corresponding tapped holes 72 of the slider 3.

In the retractable case, the stop 46 preferably comprises a head 57 provided with a shoulder relative to a body 55. An elastic return means 61 is housed in the body 55 while a screw 63 keeps the head 57 projecting relative to the base 33, against the compression of the elastic return means 61. The body 55 and the elastic return means 61 are housed in a bore 65 of the base 33 and the screw 63 is inserted into a thread 67.

The sole plate 1 comprises a recess 39 opposite the perforation 19 which defines the extended position of the slider 3. This recess 39 extends in the direction of translation T so that the head 57 of the body 55 of the retractable blocking means 46 is inserted fully into the recess 39 when the slider 3 is in the extended position, defined by the perforation 19. In addition to being able to assemble and disassemble the slider when the sole plate is attached to a panel, this arrangement protects the blocking means 46 between the slider 3 and the sole plate 1 and keeps the two "rear" ends of the slider 3 and of the sole plate 1 aligned in the extended position, as shown on FIG. 3 or FIG. 6.

In the concealable case, the stop 48 preferably comprises a screw 59 housed in a thread 58 of the slider 3. The screw head 60 is received in a recess 40 of the sole plate 1 to form a translation stop. Preferably, this recess 40 extends in the direction of translation T so that the screw head 60 of the concealable blocking means 48 is inserted fully into the recess 40 when the slider 3 is in the extended position, defined by the perforation 19. Once again, in addition to being able to assemble and disassemble the slider when the sole plate is attached to a panel, this arrangement protects the blocking means 48 between the slider 3 and the sole plate 1 and keeps the two "rear" ends of the slider 3 and of the sole plate 1 aligned in the extended position.

If the flush bearing surface 27 of the slider 3 is concealable relative to the base 33, it comprises assembly means, for example screws 66 screwed in tapped holes 68 of the slider 3.

To install the lock on a fixed panel 50 as compared with a mobile panel 30, the sole plate 1 is the only part which must be attached to it. Holes are drilled in the fixed panel 50 opposite holes 37 in the sole plate 1. Note that the lock removes the need for the difficult operations required to align the sole plate with a strike to be attached to a mobile panel as compared with a fixed panel.

Attachment means are received in the drilled holes 37 of the sole plate 1. Advantageously, the attachment means comprise, FIG. 7, rivets 53 whose heads 52 are received in a shoulder 36 of the drilled holes 37, opposite the attachment base 29. The shoulder 36 houses the head 52 of the rivets 53 in the guide means of the sole plate 1, rails 13, 15 or slides 6, 8 in a position set back from the guide means of the slider 3, respectively slides 5, 7 or rails 9, 11 when the two elements, sole plate 1 and slider 3, are inserted into one other. During the installation, the rivets 53 are inserted in the drilled holes 37 of the sole plate 1 and squeezed using a rivet rod 54 to form a bead 56 opposite the fixed panel 50.

To assemble or disassemble the slider 3 relative to the sole plate 1 previously attached to a support, the lock 44 of the locking means 43 is first actuated to retract the retractable pin 17.

In the case of the retractable blocking means, the head 57 is then moved back, for example using a blade, relative to the base 33 of the slider 3 and the slider 3 is translated relative to the fixed sole plate 1, until the slider 3 is in the retracted position, respectively FIG. 2 or FIG. 5, to release the body 55 from the blocking means 46. The head 57, projecting from the base 33, is received in the recess 39 to form a stop preventing the slider 3 from translating in the extended position, respectively FIG. 3 or FIG. 6. Note that the perforations 19, 21 of the sole plate 1 are smaller than the head 57 of the body 55 of the retractable blocking means 46, so that the slider 3 can be assembled or disassembled easily when the bore 65 housing the retractable blocking means 46 is aligned with the retractable pin 17 of the locking means 43 in the direction of translation T.

In the case of the concealable blocking means 48, the slider 3 is translated relative to the fixed sole plate 1 until the slider 3 is in the retracted position, so that the blocking screw 59 can be inserted into the corresponding thread 58. The screw head 60 is received in the recess 40 to form a stop preventing the slider 3 from translating in the extended position.

In the first and second embodiments, the slider 3 is assembled to the sole plate 1 in an assembly direction going from the perforation 19, defining the extended position, to the perforation 21, defining the retracted position. According to the third embodiment, the assembly is carried out in the opposite direction, going from the perforation 21, defining the retracted position, to the perforation 19, defining the extended position. Note that the stop 64 is added to the slider 3 before the assembly.

As indicated previously, the blocking means 46, 48, acting as a stop preventing the slider 3 from translating in the extended position, is retractable or concealable so that the sole plate 1 can advantageously be assembled "from the outside" to the fixed panel 50, using rivets 53. If the blocking means 62, 64 is integrated in or added to the slider 3, then it is the concealable flush bearing surface 27 which allows assembly "from the outside".

To lock the slider 3 in the retracted or extended position, the retractable pin 17 of the locking means 43 is inserted into one of the perforations 19, 21 of the sole plate 1.

The slider 3, the sole plate 1 and the retractable 46 or concealable 48 blocking means are preferably obtained by machining metal parts. The shim 51 is made from a non-metallic material, preferably a plastic material, such as a thermoplastic polymer. It is preferable to use a material with hydrophobic properties, such as polytetrafluoroethylene.

The lock according to the invention can be used as a main lock or as a lock complementary to an existing locking means on a motor vehicle.

The invention claimed is:

1. A lock, comprising:

a single sole plate and a slider, the slider being guided in translation relative to the single sole plate by a guide between two positions, the two positions being an extended position and a retracted position;

wherein the slider comprises a bearing surface extending in a sliding plane defined by the guide, and an indentation relative to the bearing surface that forms a first translation stop in one of the two positions;

wherein the single sole plate cooperates with a retractable pin of a lock carried by the slider, to lock the slider both in the extended position and in the retracted position;

wherein the slider further comprises, opposite the indentation relative to the retractable pin of the lock, a second translation stop in the extended position;

wherein the bearing surface is flush with a base for attaching the single sole plate; and wherein the second translation stop is received in a recess of the single sole plate.

2. The lock according to claim 1, wherein the flush bearing surface is integrated in the slider and the second translation stop is retractable perpendicularly to the sliding plane.

3. The lock according to claim 2, wherein the retractable second translation stop comprises a head and a body held in a bore of the slider by a screw, against an elastic return means.

4. The lock according to claim 1, wherein the flush bearing surface is integrated in the slider and the second translation stop is concealable in the sliding plane.

5. The lock according to claim 4, wherein the concealable second translation stop comprises a screw and a screw head received in a thread of the slider.

6. The lock according to claim 1, wherein the flush bearing surface is concealable relative to the slider and the second translation stop is integrated in or added to the slider.

7. The lock according to claim 1, wherein the single sole plate is provided with drilled holes comprising a shoulder opposite the base, the drilled holes being provided for attaching the sole plate and intended to receive a rivet head.

8. The lock according to claim 1, wherein the single sole plate comprises a first perforation and a second perforation, each cooperating with the retractable pin of the lock of the slider to lock the slider in one of the two positions using the first perforation, and in another of the two positions using the second perforation.

* * * * *